US011861083B2

(12) United States Patent
Schmidt et al.

(10) Patent No.: US 11,861,083 B2
(45) Date of Patent: Jan. 2, 2024

(54) INPUT DEVICE HAVING A MOVABLE HANDLE ON A CAPACITIVE DETECTION SURFACE AND HAVING CAPACITIVE COUPLING APPARATUSES

(71) Applicant: Preh GmbH, Bad Neustadt a.d. Saale (DE)

(72) Inventors: Benedikt Schmidt, Fladungen (DE); Manuel Wittwer, Sondheim Rhoen (DE); Markus Klein, Salz (DE); Thomas Rauch, Bischofsheim (DE); Elmar Greulich, Grafenrheinfeld (DE); Stefan Menninger, Würzburg (DE); Thomas Kleffel, Höchberg (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 45 days.

(21) Appl. No.: 17/595,884

(22) PCT Filed: Mar. 31, 2020

(86) PCT No.: PCT/EP2020/059080
§ 371 (c)(1),
(2) Date: Nov. 29, 2021

(87) PCT Pub. No.: WO2020/239295
PCT Pub. Date: Dec. 3, 2020

(65) Prior Publication Data
US 2022/0236814 A1     Jul. 28, 2022

(30) Foreign Application Priority Data

May 29, 2019   (DE) ..................... 10 2019 114 429.9

(51) Int. Cl.
*B60K 37/06*     (2006.01)
*G06F 3/0362*    (2013.01)
(Continued)

(52) U.S. Cl.
CPC ............ *G06F 3/0393* (2019.05); *B60K 37/06* (2013.01); *G06F 3/016* (2013.01); *G06F 3/0362* (2013.01);
(Continued)

(58) Field of Classification Search
CPC ...... G06F 3/0393; G06F 3/016; G06F 3/0362; G06F 3/0446; B60K 37/06;
(Continued)

(56) References Cited

U.S. PATENT DOCUMENTS 11,435,862 B2 *  9/2022  Sasaki ................... G06F 3/0488
2013/0181935 A1  7/2013  Mckenzie et al.
(Continued)

FOREIGN PATENT DOCUMENTS

DE    102017212056 A1     1/2019
DE    102020128423 A1 *   5/2022
WO    WO-2018137944 A1    8/2018

OTHER PUBLICATIONS

"International Application Serial No. PCT/EP2020/059080, International Search Report dated Jul. 14, 2020", w/ English Translation, (Jul. 14, 2020), 5 pgs.
(Continued)

*Primary Examiner* — Temesghen Ghebretinsae
*Assistant Examiner* — Karin Kiyabu
(74) *Attorney, Agent, or Firm* — Schwegman Lundberg & Woessner, P.A.

(57) ABSTRACT

The invention relates to an input device comprising capacitive detection device having detection surface including first array of array electrodes; electronic evaluation unit electrically connected to array electrodes to form associated electric measuring field array for spatially resolving detection of capacitive influence on detection surface; handling means disposed on detection surface to be movable along an
(Continued)

adjustment path parallel to detection surface, in order to perform an operating input; position indicator; and coupling device with a first surface on which a second array of coupling electrodes is formed, and with a second surface on which a third array including spaced-apart contact surfaces is formed. Based on the position of the handling means, contact surfaces are touch-contacted by the position indicator. The coupling device includes several electrically conductive connections to capacitively influence the measuring field array. The electronic evaluation unit is configured to detect position-dependent influence on measuring field array.

10 Claims, 4 Drawing Sheets

(51) Int. Cl.
  *G06F 3/039*    (2013.01)
  *G06F 3/044*    (2006.01)
  *G06F 3/01*     (2006.01)
(52) U.S. Cl.
  CPC ...... *G06F 3/0446* (2019.05); *B60K 2370/143* (2019.05); *B60K 2370/158* (2019.05)

(58) Field of Classification Search
  CPC ........ B60K 2370/143; B60K 2370/158; B60K 2370/1438; B60K 2370/145; B60K 35/00; H03K 17/975
  See application file for complete search history.

(56) References Cited

U.S. PATENT DOCUMENTS

| | | | |
|---|---|---|---|
| 2014/0042004 A1 | 2/2014 | Tseng | |
| 2014/0198062 A1* | 7/2014 | Kreutzer | G06F 1/1643 345/173 |
| 2018/0314357 A1* | 11/2018 | Klein | G06F 3/04144 |
| 2020/0104006 A1* | 4/2020 | Rao | G07C 5/0808 |
| 2022/0253158 A1* | 8/2022 | Gaillard | G06F 3/017 |

OTHER PUBLICATIONS

"International Application Serial No. PCT/EP2020/059080, Written Opinion dated Jul. 14, 2020", (Jul. 14, 2020), 7 pgs.

* cited by examiner

INPUT DEVICE HAVING A MOVABLE HANDLE ON A CAPACITIVE DETECTION SURFACE AND HAVING CAPACITIVE COUPLING APPARATUSES

PRIORITY APPLICATIONS

This application is a U.S. National Stage Filing under 35 U.S.C. § 371 from International Application No. PCT/EP2020/059080, filed on Mar. 31, 2020, and published as WO2020/239295 on Dec. 3, 2020, which claims the benefit of priority to German Application No. 10 2019 114 429.9, filed on May 29, 2019; the benefit of priority of each of which is hereby claimed herein, and which applications and publication are hereby incorporated herein by reference in their entireties.

The invention relates to an input device having a capacitive detection device, wherein the detection device has a detection surface while forming a first array of array electrodes associated with the detection surface. For example, this first array is formed of two groups of electrodes, which are arranged in groups parallel to one another and so as to define a group orientation in the process, and which, from group to group and given a vertical imaginary projection onto a common plane, cross one another several times, e.g. cross one another orthogonally, while being, however, electrically insulated from one another. A regular grid structure is thus formed while forming a so-called junction point at the crossing locations. The distance between most closely adjacent junction points in the two directions defined by the group orientation describes the periodicity of the grid structure. Usually, the distance between most closely adjacent junction points in the two directions determined by the group orientation matches. For example, the detection device is a capacitive touchscreen or a capacitive touchpad. Further, an electronic evaluation unit is provided in these generic input devices, which is electrically connected to the array electrodes in order to form, by means of the first array of array electrodes, an associated electric measuring field array for the spatially resolving detection of a capacitive influence on the detection surface. The individual measuring fields of the measuring field array are usually generated by a corresponding activation in a chronological sequence.

Moreover, a handling means, whose position is to be detected by means of the detection device, is now movably disposed on the detection surface defined by the detection device. For this purpose, the handling means has a position indicator that is moved along, in order to cause an influence on at least one of the measuring fields, which is detectably by the detection device and from which position and/or movement information can be derived. Such a combination of a touchpad or touchscreen with an input device formed by a handling means movably disposed thereon is becoming increasingly popular, because flexible inputting options are being provided in this manner, and because, particularly in the case of a touchscreen, a variety of functions and function information can be associated with the handling means due to the flexible displaying options. On the other hand, however, the handling means provides a familiar haptic feedback and can easily be located by feel by the user without any visual contact. Because of the intended utilization for position detection of the region of the capacitive electrode structure, which is located underneath the handling means and covered by the handling means, a capacitive coupling between the handling means, particularly of the position indicator provided therein, and the first array of array electrodes is required. The problem of capacitive coupling, which regularly presents itself in this case, results from the fact that the track that the position indicator describes when the handling means is manually moved along the adjustment path can never be completely aligned with the structure defined by the first array of array electrodes, and that thus, the positional detection is unreliable and susceptible to error at least for some positions of the handling means.

Against this background, there was a demand for a generic input device in which a capacitive coupling is obtained, and thus a position detection, which is improved, i.e. more uniform, for all positions of the handling means, and in which particularly the capacitive coupling between the capacitive detection device, e.g. the capacitive touchscreen, and the position indicator of the handling means is improved. This object is achieved by an input device according to claim 1. An equally advantageous use is the subject matter of the independent claim. Advantageous embodiments are in each case the subject matter of the dependent claims. It must be noted that the features cited individually in the claims can be combined with each other in any technologically meaningful manner and represent other embodiments of the invention. The description, in particular in connection with the figures, additionally characterizes and specifies the invention.

The invention relates to an input device including a capacitive detection device, in which case the detection device has a detection surface while forming a first array of array electrodes associated with the detection surface. For example, the array electrodes are disposed in a common plane or on two or more parallel planes. For example, this first array is formed of two groups of array electrodes, which are arranged in groups parallel to one another and so as to define a group orientation in the process, and which, from group to group and given a vertical imaginary projection onto a common plane, cross one another several times, e.g. cross one another orthogonally, while being, however, electrically insulated from one another. A regular grid structure is thus formed while forming a so-called junction point at the crossing locations. The distance between most closely adjacent junction points in the two directions defined by the group orientation describes the periodicity of the grid structure. Usually, the distance between the junction points in the two directions determined by the group orientation matches. In this case, the position of the measuring fields to be generated by the array electrode is respectively defined by the position of the junction points.

The term electrode is supposed to imply the construction of the array electrode concerned from a conductive material, e.g. of metal or a metallic alloy. For example, this is a capacitive detection device with a projected capacitive technology, in particular with a mutual-capacitance structure. In the mutual-capacitance structure, measuring fields are generated, as described above, at the junction points between, in each case, two electrically insulated array electrode structures crossing one another. In commercially available touchpads or touchscreens, the junction points are arranged in a right-angled grid.

According to the invention, an electronic evaluation unit is also provided, which is electrically connected, preferably in an electrically conducting manner, to the array electrodes, in order to form, by means of the first array of array electrodes, an associated array of electric measuring fields, hereinafter referred to as a measuring field array, which is preferably generated in a sequence in time and varies in time, for the spatially resolving detection of a capacitive influence on the detection surface.

The evaluation unit is capable of measuring the influence on the capacitively generated measuring fields. If the respective measuring field is influenced by the external approach of an object, the electrical influence measured by the evaluation unit, e.g. at the respective junction point, is altered and detected, and can be associated with a location on the detection surface due to the array electrode structure, which is preferably provided with a pattern of rows and columns.

According to the invention, the input device includes a handling means, which is disposed on the detection surface by means of a supporting means, preferably attached by means of the supporting means, so as to be movable along an adjustment path parallel to the detection surface, in order to perform an operating input in the case of movement, particularly while the handling means is touched by an operator. For example, this is a handling means that is mounted so as to be translationally movable along a linear adjustment path in a direction parallel to the detection surface. Preferably, the handling means is mounted on the detection surface in a manner rotatable about an axis of rotation orthogonal to the detection surface, thus qualifying the handling means of the input device as a rotary adjuster.

According to the invention, a position indicator moved along with the handling means, which thus moves synchronously with the handling means, is also provided. For example, this is an electrical conductor which is configured, for example, as a spring tongue. For example, the position indicator is configured so as to be electrically insulated from the evaluation unit. It may have a single-part of multi-part configuration, with the several parts preferably being connected in an electrically conductive manner. In one configuration, the position indicator is connected in an electrically conductive manner with the surface of the handling means facing towards the operator, in order to be charged or discharged to the electrical potential of the operator when touched by the latter.

Moreover, a single-part or multi-part coupling device is provided, which is non-movably disposed on the detection surface. The former has a first surface, which faces towards the detection surface and on which a second array of coupling electrodes for capacitive coupling to the above-described array electrodes is formed without electrically contacting the latter. The coupling device further has a second surface, which faces towards the position indicator and faces away from the detection surface, and on which a third array consisting of several spaced-apart contact surfaces is formed. The contact surfaces are arranged along one or several tracks parallel to the adjustment path in such a manner that, selectively and dependent on the position of the handling means along the adjustment path, they are touch-contacted by the position indicator. The contact surfaces are made from electrically conductive material. For example, they are formed by a conductive coating on a substrate, as is the case in a circuit board, for example. The coupling device contains several electrically conductive connections, the number of which corresponds to at least the number of contact surfaces, and which are configured to connect, in each case, one of the coupling electrodes with one contact surface in an electrically conductive manner in order to capacitively influence, depending on the position, at least one measuring field, and preferably and primarily one of the measuring fields of the measuring field array, in the case of a touching contact with the position indicator. In a preferred configuration, at least one coupling electrode is provided which is electrically connected with several contact surfaces via several electrically conductive connections, whereby the number of connections increases as compared with the number of contact surfaces.

According to the invention, the electronic evaluation unit is configured for detecting the influence on the measuring field due to at least one capacitive coupling, wherein the contact surface selected in this case is determined by the position of the position indicator and the capacitive coupling arises in each case between the coupling electrode, which is contacted in a position-dependent manner by the position indicator via the contact surface and the respective electrical connection, and the adjacently disposed and associated measuring field of the measuring field array generated by the first array of array electrodes. As was explained above, it is possible, for example, that due to multiple capacitive couplings, an influence on several measuring fields of different array electrodes occurs in one or several positions of the position indicator, because according to one configuration, the contact surface is connected to several coupling electrodes in an electrically conductive manner via, in each case, one connection, or the position indicator contacts several contact surfaces in parallel in a single position. The electronic evaluation unit is capable of detecting the previously explained position-dependent influence on the measuring fields in order to obtain and output a positional information and/or movement information of the handling means. In other words, the evaluation unit is capable of identifying the influence on the respective measuring fields caused by the position of the handling means, and thus of the position indicator, and thus associate a positional information with the influence and output it to a higher-level control device for performing a controlling or switching function, for example.

According to the invention, the coupling device has a substrate made from an electrically insulating material, such as a plastic, and the conductive connections are formed, at least in some portions, as a conductor path provided by a conductive coating of the substrate. Thus, the offset of the contact surface and the associated array electrode can be compensated comparatively easily, because that may be different for each contact surface, particularly because the first and second arrays differ with regard to their structure and cannot be configured in a congruent manner, because the adjustment path is not guided by the structure of the first array, e.g. extends in a curved or oblique manner relative to the grid of the first array. The remaining rest of the conductive connection may be formed, for example, as a stamped part of a metal or a metallic alloy. Preferably, the conductive connection is formed along its entire length between the contact surface and the coupling electrode as a conductive coating of a substrate.

In order to simplify manufacture, it is preferably provided that the contact surfaces and/or coupling electrodes are also formed as a conductive coating of the substrate or another one. For example, the substrate is coated on both sides.

It is preferably provided that the conductor paths extend substantially parallel to the detection surface. In other words, the dominant extending direction is parallel to the detection surface. Preferably, the conductor path is disposed in a common plane which is parallel to the detection surface.

Preferably, it is provided that at least two conductor paths, preferably more than two conductor paths, most preferably at least half to all of the conductor paths differ in length. A conductor path is understood to be the part of the conductive connection between a contact surface and a coupling electrode that is located on a substrate. The length of the conductor path is understood to be the length of the part located on the substrate, wherein the transition towards the coupling electrode or the contact surface is in each case determined by the latter's external outline. The contact surface is determined by the external outline of the touch surface defined due to the track of the position indicator.

Preferably, several, preferably half to all, of the conductor paths are configured to connect such a contact surface to such a coupling electrode whose geometric center points are disposed offset from each other if projected onto the detection surface.

According to a preferred embodiment, the first array of array electrodes is described by a regular imaginary structure, preferably a grid structure, with a smallest periodicity, such as the smallest distance between most closely adjacent junction points, and the second array has a structure, particularly a regularity, determined by the periodicity. For example, the geometric center points of the coupling electrode have a distance from each other that corresponds to the integer multiple of the smallest distance between most closely adjacent junction points.

It is preferably provided that the at least two connections differ, with regard to the length of their conductor paths, by at least the smallest periodicity of the regular imaginary structure of the first array of array electrodes. For example, the lengths, with regard to their absolute value, differ by at least the smallest distance between most closely adjacent junction points of the grid structure describing the first array.

Preferably, the coupling device has a layer structure of several layers, such as a multi-layer circuit board, containing the substrate, and the contact surfaces and/or the coupling electrodes are formed as a conductive coating of the layer structure. Preferably, the conductor paths are integrated into the layer structure for electrical connection between the contact surfaces and the coupling electrodes.

Preferably, a latching device is provided for generating latching haptics and for predefining predefined positions along the adjustment path of the handling means. For example, the latching device has a latching lug and a latching contour, wherein the latching lug is in operative engagement with the latching contour and is biased against the latching contour, and runs on the latching contour when the handling means is adjusted in order to engage a latching depression after overcoming a latching protrusion, wherein the latter define the predefined positions.

According to the invention, at least one coupling electrode is provided that is connected in an electrically conductive manner to several contact surfaces via several conductor paths preferably differing from each other in length.

Preferably, the coupling device is configured in such a manner that, when the handling means is adjusted along the adjustment path in an adjusting direction, several directly adjacent and predefined positions are traversed, wherein, of the coupling electrodes contacted in total in these positions by means of the position indicator, at least two, preferably all, are arranged in such a manner that their distance in space from each other is greater than the first periodicity, preferably greater than the smallest distance between most closely adjacent junction points of the first array.

According to one configuration, the position indicator is connected in an electrically conductive to a conductive surface configured and arranged for being touched by an operator, so that it can thereby be provided with a potential. Preferably, however, it is provided that the coupling device is configured in such a manner that the position indicator is capacitively coupled, via the coupling device, to an electric field of at least one array electrode.

Preferably, the coupling device has at least one feed electrode on its first surface and at least one feed contact surface electrically conducting therewith on its second surface, by means of which the position indicator is in touching contact at least in the predefined positions in order to capacitively couple the position indicator to the electric field of at least one array electrode.

In the case of a rotatably mounted handling means and with respect to the associated axis of rotation, the feed electrodes are preferably arranged radially outwards with respect to the second array of coupling electrodes.

In the case of a rotatably mounted handling means and with respect to the associated axis of rotation, the feed contact surfaces are preferably arranged radially outwards with respect to the third array of contact surfaces.

Furthermore, the invention relates to the use of the input device in one of the above-described embodiments in a motor vehicle.

The invention is explained further with reference to the following Figures. The Figures are to be understood only as examples and merely represent preferred variants of the embodiments. In the Figures.

Figure 1:
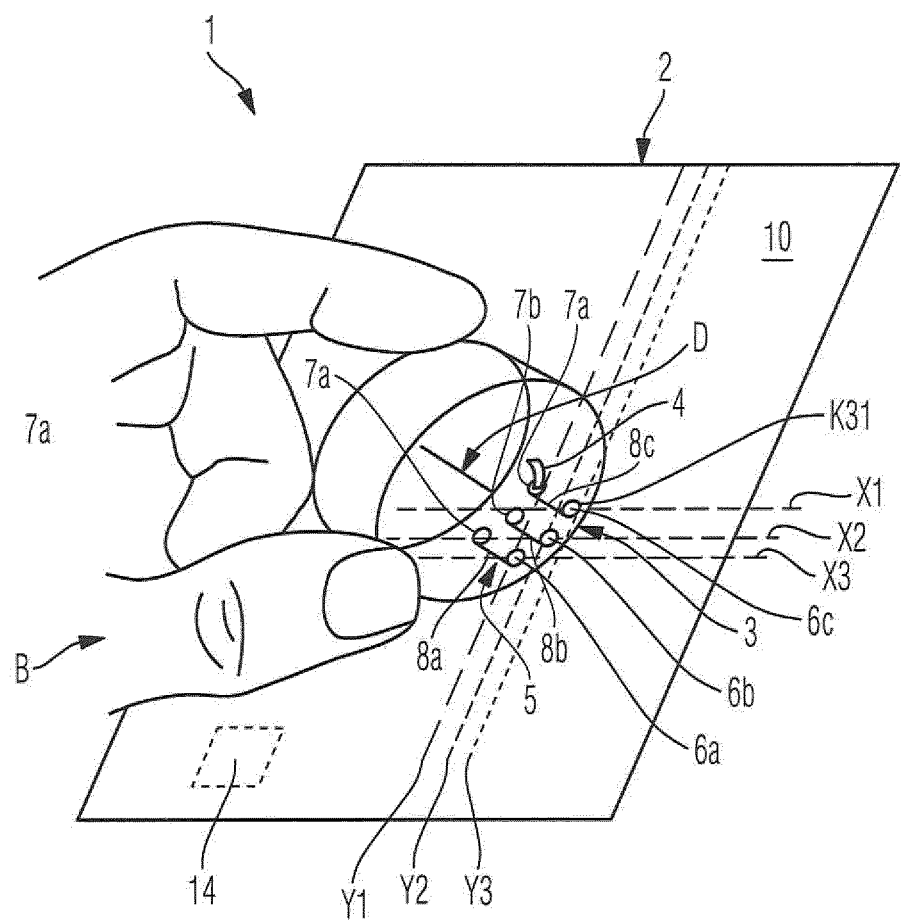
FIG. 1 shows a perspective top view of an embodiment of the input device 1 according to the invention.

FIG. 1 shows an input device 1 according to the invention, with a touchscreen functioning as a capacitive detection device 2. The detection device 2 defines a detection surface 10 facing towards the operator B, on which a handling means 3 is disposed so as to be mounted rotatably about an axis of rotation D by means of the supporting means, which are not shown in FIG. 1 for better clarity, thus forming a so-called rotary adjuster. The capacitive detection device 2 has array electrodes X1 to X3 that extend parallel to each other, and array electrodes Y1 to Y3 extending perpendicularly thereto as counter electrodes, whereby a first array is formed. The first array of array electrodes X1 to X3, Y1 to Y3 is not depicted in full and to scale in the Figures and is only supposed to serve for the schematic illustration of the general structure. The crossing points of the array electrodes X1 to X3 with the array electrodes Y1 to Y3 each form an imaginary junction point which is in each case the starting point of a capacitive measuring field. For reasons of clarity, only one junction point, i.e. K31, is labeled more clearly in the figure. The numbering of the other junction points is analogous therewith.

An electronic evaluation unit 14 is electrically connected to the array electrodes X1 to X3 and Y1 to Y3, which, for generating an associated measuring field, applies an associated potential in each case to some of the array electrodes, e.g. to the electrodes X1 to X3, selectively and in a sequence in time, in order to detect a touch by the operator B or, depending on the position of the respective junction points relative to the handling means 3, a position of the handling means 3, based on the influence on these measuring fields. In order to influence the respective measuring fields, the handling means 3 has on the side thereof facing towards the detection surface 10 a position indicator 4, which in the present embodiment is disposed in an electrically insulated manner with respect to the operator B while the latter touches the handling means 3, and which, instead of the potential of the operator being applied thereto, is coupled to the electrical field of at least one of the array electrodes. Several predefined positions are provided, in particularly ones that are uniformly distributed across the adjustment path of the handling means 3, of which one possible position is shown in FIG. 1. These positions are predefined by a latching device that is not shown.

Figure 3:
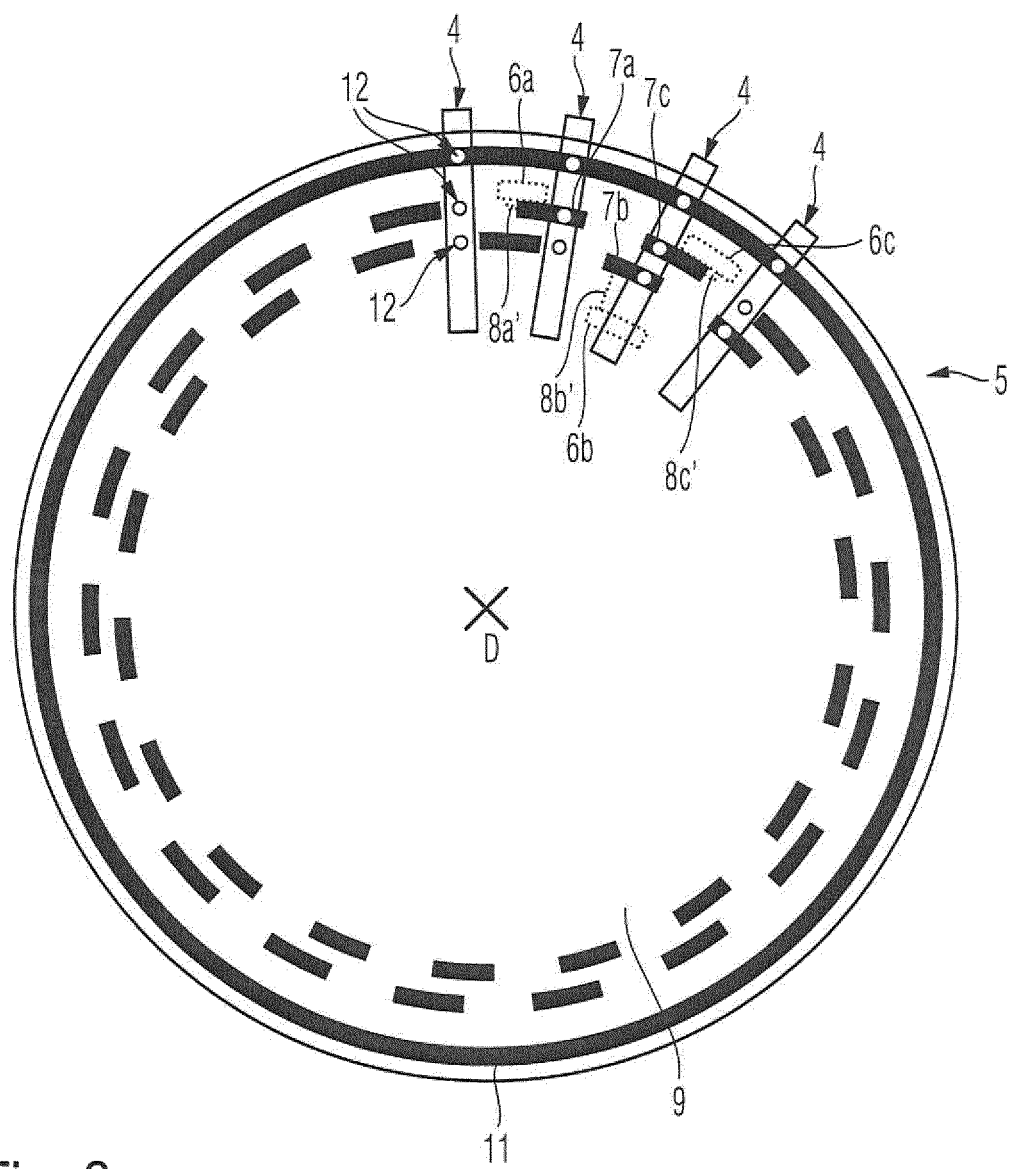
FIG. 3 shows a top view of the second side, which faces towards the position indicator 5, of the coupling device 5 associated with the input device according to the invention in an exemplary embodiment.
Figure 4:
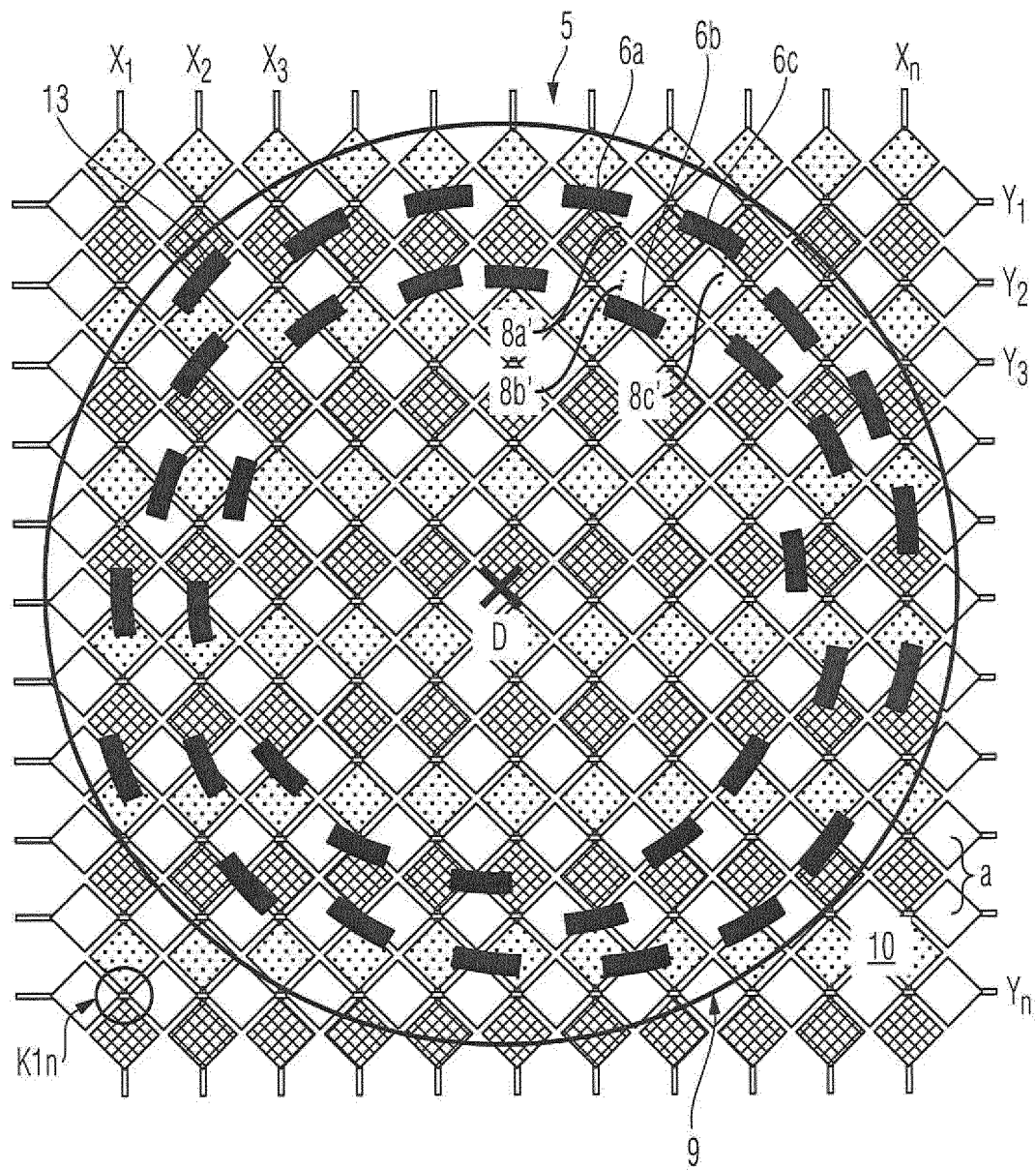
FIG. 4 shows a top view of the first side, which faces towards the position indicator 5, of the coupling device 5 associated with the input device according to the invention in an exemplary embodiment, with the first array of coupling electrodes located thereunder being shown for a better understanding.
Figure 5:
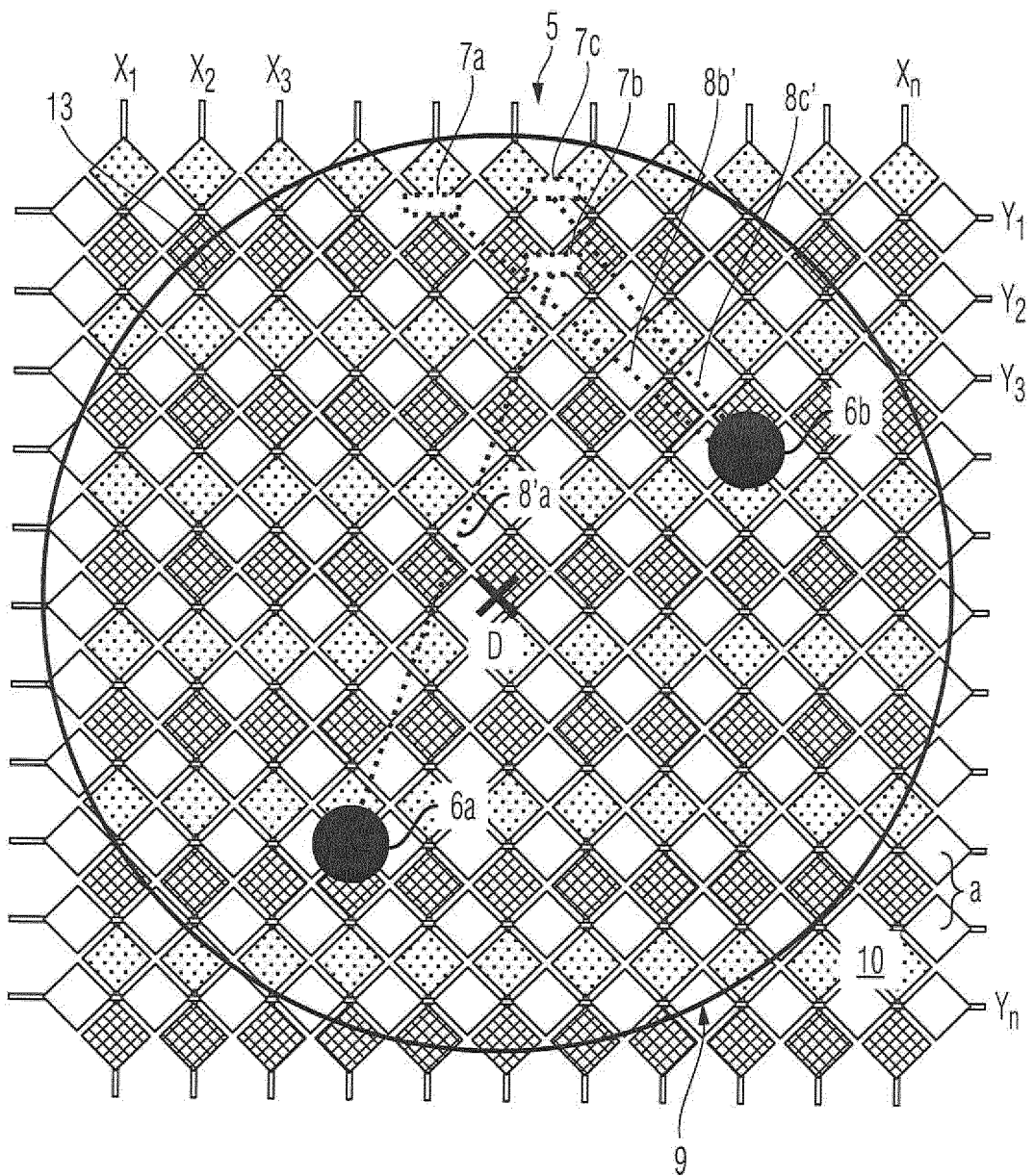
FIG. 5 shows a top view of the first side, which faces towards the position indicator 5, of the coupling device 5 associated with the input device according to the invention in another exemplary embodiment, with the first array of coupling electrodes located thereunder being again shown for a better understanding.

For an improved capacitive coupling between the position indicator 4 and, depending on the position, one of the measuring fields located at the junction points K11 to K33, a coupling device 5 disposed in a stationary manner on the detection surface 10 is provided. It has a first surface facing towards the detection surface 10 and a second surface facing towards the position indicator 4. For example, the first surface is disposed adjacent to the detection surface. Two possible embodiments of the first surface are shown in FIGS. 4 and 5. An embodiment of the second surface is shown in FIG. 3. The first surface carries a second array of coupling electrode 6a, 6b, 6c, of which only a portion is shown in FIG. 1, while the second surface carries a third array of contact surfaces 7a, 7b, 7c, only a portion of which is also shown in FIG. 1. The placement of the coupling electrode 6a, 6b, 6c of the second array on the first side is not congruent with the placement of the contact surfaces 7a, 7b, 7c of the third array on the second side, which can be ascribed to the fact that the placement of the contact surfaces 7a, 7b, 7c is subject to different requirements from those of that of the coupling electrodes 6a, 6b, 6c. In order to obtain an effective coupling, the latter are guided by the grid structure of the first array, so that the geometric center point of the coupling electrode 6a, 6b, 6c is in each case opposite a junction point, e.g. K31 from FIG. 1, without the coupling electrodes 6a, 6b, 6c and the array electrodes X1 to X3 and Y1 to Y3 of the touchscreen touching each other.

In contrast, the contact surfaces 7a, 7b, 7c follow the track of the position indicator 4 along which the latter moves during the manual movement of the handling means 3 and, depending on the position, establishes a touching contact with at least one of the contact surfaces 7a, 7b, 7c. In order to now capacitively influence, in a position-dependent manner, one of the measuring fields of the array electrodes by means of the position indicator 4 via one of the coupling electrodes 6a, 6b, 6c, one electrically conductive connection 8a, 8b, 8c, respectively, is provided, which starts at one contact surface 7a, 7b, 7c and extends towards one coupling electrode 6a, 6b, 6c. In order to solve the problem of the arrangement of the coupling electrodes 6a, 6b, 6c on the one hand and the contact surfaces 7a, 7b, 7c, the coupling device 5 has a substrate 9a, which is shown in a cross-section in FIG. 2, which is made from an electrically insulating material, and on which the conductive connections 8a are formed, in each case at least in some portions, as a conductor path 8a, 8b, 8c provided by a conductive coating of the substrate 9a. In the present configuration, the substrate 9a is a fiber reinforced plastic or a plastic sheet and a part of the layer structure 9 associated with the coupling device. The conductor paths 8a, 8b, 8c are preferably integrated into the layer structure. The contact surfaces 7a, 7b, 7c as well as the conductive coating 6a, 6b, 6c are in each case formed as conductive coatings of the outer layers of the layer structure 9. For example, the layer structure is a multi-layer circuit board in which the conductor paths 8a, 8b, 8c are embedded in the multi-layer.

Figure 2:
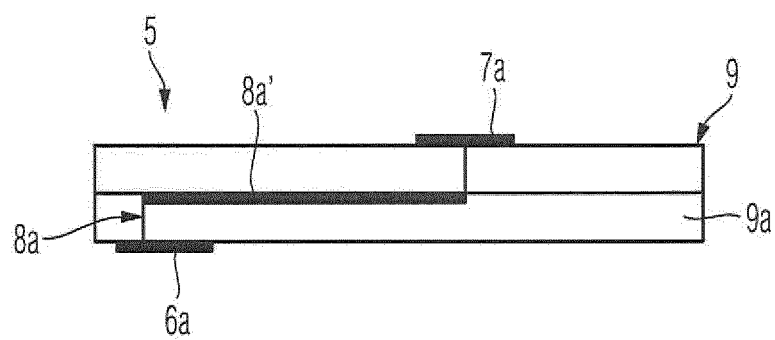
FIG. 2 shows a sectional view of the coupling device 5 associated with the input device according to the invention in an exemplary embodiment.

Even though only one of the conductor paths 8a, 8b, 8c from FIG. 1 is shown, it also becomes clear from FIG. 2 that the conductor paths 8a, 8b, 8c extend substantially parallel to the detection surface 10 from FIG. 1 and in each case serve for bridging the offset between the geometric center point of the contact surface 7a, 7b, 7c and the geometric center point of the coupling electrodes 6a, 6b, 6c. It also becomes clear that at least two connections differ with respect to the length of their conductor paths, i.e. 8b and 8c. The structure of the coupling device 5 on its second surface, which faces towards the position indicator 4, becomes clear from FIG. 3. For illustration purposes, the position indicator 4 is shown in a superposed manner in four adjacent, predefined positions, with the points 12 identifying the position of its spring tongues with which, depending on the position, it touch-contacts the contact surfaces 7a, 7b, 7c but also touches an annular feed contact surface 11 in order thus to be coupled to an electrical field of at least one array electrode, because the feed contact surface 11 is in electrical contact with several feed electrodes 13 disposed on the first surface of the coupling device 5. The position and the outline of the coupling electrodes 6a, 6b, 6c, which are located on the first surface of the coupling device 5 and which are contacted via the conductor paths 8a, 8b, 8c integrated into the layer structure 9, is shown with a dotted line.

FIG. 4 is a view of the first side of the coupling device 5 facing towards the detection surface 10, wherein the view onto the detection surface 10 with the first array of array electrodes X1 to Xn, Y1 to Yn associated therewith is superposed thereon for illustrating the position of the coupling electrodes 6a, 6b, 6c. The array forms an imaginary, regular grid structure, wherein the position of the junction points defines a smallest periodicity determined by the smallest distance a between most closely adjacent junction points. It becomes apparent that the coupling electrodes are arranged with their geometric center point above an associated junction point in each case. For example, Kin is marked as one of the many junction points in FIG. 4. In accordance with the nomenclature, the coupling electrode 6a is associated with the junction point K71. Given a corresponding position of the handling means 3, the coupling electrodes 6a to 6c serve for providing a capacitive coupling between the position indicator 4 and the measuring fields located at the junction points, so that the respective measuring fields are influenced in the area of the junction points, which can be detected by the evaluation unit 14 and serves for the position detection of the evaluation unit 14, so that the latter is capable of outputting a positional information or at least movement information. While FIG. 4 shows an embodiment of the coupling device 5 in which a number of coupling electrodes 6a, 6b, 6c matches that of the number of predefined positions of the handling means in order thus to be able to detect the position in absolute terms, embodiments are conceivable in which only a relative detection, in which only the extent of the rotation and/or the direction of rotation has to be detected as movement information, is of importance. Such an embodiment, in which several contact surfaces are connected to one coupling electrode 6a, 6b, is shown in FIG. 5. Thus, as depicted, only two coupling electrodes 6a, 6b are provided, wherein the contact surfaces 7a, 7b, 7c are connected in an alternating manner to one of the coupling electrodes 6a, 6b in the peripheral direction about the axis of rotation D. The associated electrical connections in this case have conductor paths 8a, 8b, 8c, which differ with respect to their length by a multiple of the smallest distance a between most closely adjacent junction points.

The invention claimed is:

1. An input device, comprising:
a capacitive detection device comprising a detection surface, the detection surface having a first array of array electrodes formed thereon;
an electronic evaluator connected to the array electrodes, the electronic evaluator forming, by means of the first array of array electrodes, an associated measurement field array for spatially resolving detection of a capacitive influence on the detection surface;
a handle mounted on the detection surface, the handle being movable along an adjustment path parallel to the detection surface, to perform an operating input by means of a manually effected movement as provided by an operator in a movement direction;
a position indicator configured to move along with the handle; and
a coupling device disposed on the detection surface and including a first surface which faces the detection surface and on which a second array of coupling electrodes for capacitive coupling with the array electrodes is formed, the coupling device including a second surface which faces the position indicator and away from the detection surface and on which a third array is formed, the third array including contact surfaces that are spaced apart, wherein the contact surfaces are arranged along one or more tracks parallel to the adjustment path such that the contact surfaces are, selectively and dependent on a position of the handle along the adjustment path, touch-contacted by the position indicator,
wherein the coupling device includes plural electrically conductive connections, a number of the plural electrically conductive connections being greater than or equal to a number of the contact surfaces, each of the plural electrically conductive connections being configured to connect one of the coupling electrodes with one contact surface in order to capacitively influence at least one measurement field of the measurement field array when touch-contacting with the position indicator,
wherein the electronic evaluator is configured to detect a position-dependent influence on the measuring field array in order to obtain and to output at least one of position information or movement information of the handle,
wherein the coupling device has at least one substrate with an electrically insulating material and the conductive connections are each formed, at least in some portions, as a conductor track provided by a conductive coating of the at least one substrate, and at least two connections differ with respect to a length of their conductor tracks,
wherein the first array of array electrodes comprises a regular grid structure with a smallest periodicity corresponding to a smallest distance between most closely-adjacent nodes, and
wherein the coupling device is fixedly placed on the detection surface such that geometric center points for each of the coupling electrodes is situated opposite a node, and such that the at least two connections differ with respect to the length of their conductor tracks by at least the smallest periodicity.

2. The input device according to claim 1, wherein the conductor tracks extend substantially parallel to the detection surface.

3. The input device according to claim 1, wherein the coupling device comprises a layer structure with plural layers including the substrate, and
wherein at least one of the contact surfaces or the coupling electrodes is formed as a conductive coating for outer layers of the layer structure.

4. The input device according to claim 1, wherein at least half of the conductor tracks are configured to connect a contact surface to a coupling electrode having geometric center points that are disposed offset from each other when projected vertically onto the detection surface.

5. The input device according to claim 1, wherein the second array of coupling electrodes has a structure determined by the smallest periodicity.

6. The input device according to claim 1, wherein at least one coupling electrode is provided that is electrically conductively connected to one or more of the contact surfaces via several conductor tracks differing from each other in length.

7. The input device according to claim 1, wherein the coupling device is configured such that, when the handle is adjusted along the adjustment path in an adjusting direction, plural directly adjacent and predefined positions are traversed,
wherein at least two of the coupling electrodes contacting the position indicator are arranged such that their distance in space from each other is greater than the smallest periodicity.

8. The input device according to claim 7, wherein the coupling device is configured such that the position indicator is capacitively coupled, via the coupling device, to an electric field of at least one array electrode.

9. The input device according to claim 8, wherein the coupling device has at least one feed electrode on the first surface and at least one feed contact surface, which is electrically conductively connected thereto, on the second surface, and
wherein the position indicator is in touching contact at least in the predefined positions in order to couple the position indicator to the electric field of the at least one array electrode.

10. The input device according to claim 1, wherein the input device is configured for use in a motor vehicle.

* * * * *